United States Patent [19]

Dohner

[11] Patent Number: 4,689,166

[45] Date of Patent: Aug. 25, 1987

[54] SUCCINIC ACID ESTERS AND HYDRAULIC FLUIDS THEREFORM

[75] Inventor: Brent R. Dohner, The Woodlands, Tex.

[73] Assignee: Pennzoil Product Company, Houston, Tex.

[21] Appl. No.: 886,776

[22] Filed: Jul. 17, 1986

[51] Int. Cl.$^4$ ................ C10M 129/66; C10M 173/02
[52] U.S. Cl. .................................. 252/75; 252/49.3;
252/52 A; 252/56 D; 252/76; 252/79;
252/174.21; 252/174.22; 560/198; 560/200
[58] Field of Search .............. 252/49.3, 52 A, 56 D,
252/75, 76, 79, 174.21, 174.22; 560/198, 200

[56] References Cited

U.S. PATENT DOCUMENTS

| | | | |
|---|---|---|---|
| 2,944,976 | 7/1960 | Waters et al. | 252/76 |
| 2,993,773 | 7/1961 | Stromberg | 60/209 |
| 3,005,776 | 10/1961 | Langer et al. | 252/77 |
| 3,045,042 | 7/1962 | Staker | 560/196 |
| 3,197,409 | 7/1965 | de Vries | 252/56 D |
| 3,255,108 | 6/1966 | Wiese | 252/32.7 |
| 3,381,022 | 4/1968 | Le Suer | 252/56 D |
| 3,419,665 | 12/1968 | Lachampt et al. | 424/365 |
| 3,428,561 | 2/1969 | Le Suer | 252/32.5 |
| 3,449,236 | 6/1969 | Engelhart | 208/28 |
| 3,579,453 | 5/1971 | Dupre et al. | 252/89.1 |
| 3,580,847 | 5/1971 | Boehmer et al. | 252/75 |
| 3,590,076 | 6/1971 | Heintzelman et al. | 560/198 |
| 3,640,872 | 2/1972 | Wiley et al. | 252/75 |
| 3,657,123 | 4/1972 | Stram | 252/34.7 |
| 3,694,176 | 9/1972 | Miller | 44/62 |
| 3,833,502 | 9/1974 | Leary et al. | 252/49.5 |
| 3,859,318 | 1/1975 | Le Suer | 560/198 |
| 3,923,669 | 12/1975 | Newingham et al. | 252/32.7 E |
| 3,939,088 | 2/1976 | Goldschmidt et al. | 252/56 D |
| 3,957,854 | 5/1976 | Miller | 560/198 |
| 4,012,438 | 3/1977 | Lavigne | 252/56 D |
| 4,036,772 | 7/1977 | Dorer, Jr. | 252/56 R |
| 4,041,056 | 8/1977 | Heintzelman et al. | 260/404.5 |
| 4,086,251 | 4/1978 | Cengel et al. | 549/255 |
| 4,151,099 | 4/1979 | Nassry et al. | 252/32.7 E |
| 4,256,605 | 3/1981 | Baker | 252/312 |
| 4,257,902 | 3/1981 | Singer | 252/18 |
| 4,368,133 | 1/1983 | Forsberg | 252/75 |
| 4,440,902 | 4/1984 | Diery et al. | 525/404 |
| 4,447,348 | 5/1984 | Forsberg | 252/75 |
| 4,450,281 | 5/1984 | Wollenberg | 549/255 |
| 4,481,125 | 11/1984 | Holgado | 252/75 |
| 4,504,275 | 3/1985 | Baker | 44/51 |
| 4,504,276 | 3/1985 | Baker | 44/51 |
| 4,509,950 | 4/1985 | Baker | 44/51 |

Primary Examiner—Robert A. Wax
Attorney, Agent, or Firm—Lowe, Price, LeBlanc, Becker & Shur

[57] ABSTRACT

Hydraulic fluids contain as novel dispersants, reaction products of di- or trisuccinic anhydrides with polyethoxylated alcohols to produce polyethoxylated hydrocarbyl polyanhydrides.

25 Claims, No Drawings

SUCCINIC ACID ESTERS AND HYDRAULIC FLUIDS THEREFORM

FIELD OF THE INVENTION

This invention relates to new hydrocarbyl succinic esters and more particularly to aqueous based hydraulic fluids which contain hydrocarbyl succinic acid esters, which hydraulic fluids have improved characteristics in being stable and possessing excellent hard water stability.

BACKGROUND

Aqueous based hydraulic fluids are well known in the art as exemplified, for example, by U.S. Pat. Nos. 3,580,847, 4,151,099, 3,657,123, 3,005,776, 2,994,976, and 4,257,902. These aqueous based hydraulic fluids are used in various areas as mechanical power or pressure transmitting media in situations where lubricating and wear preventing characteristics are necessary. In the technology of hydraulic power transmission, mechanical power is imparted to a fluid called a hydraulic fluid in the form of pressure by means of a hydraulic pump. Power is utilized where desired by tapping a source of the hydraulic fluid and transforming the power as pressure back to mechanical motion by a hydraulic motor. The hydraulic fluid is utilized as a pressure and volume transmitting medium and any non-compressible fluid can perform the function. Water is the oldest fluid used for this purpose and is still sometimes used without additives. In the prior art, however, there has been heavy emphasis on the development of aqueous based fluids which contain various types of additives and which are designed and manufactured specifically for specialty uses.

Within any hydraulic system there are found such metals as iron, brass, solder, bronze, aluminum, zinc, cadmium and other commonly used metals and the presence of several metals in a hydraulic system provides the possibility for the formation of various corrosion problems. Therefore, such fluids traditionally contain corrosion inhibitors.

Such fluids also generally contain emulsifying agent or dispersants and various other additives such as thickening agents, freezing point depressants, anti-wear agents, and various other additive designed to meet problems encountered in use of the hydraulic or functional fluids.

It is also known that lubricating compositions including power transmitting fluids can contain hydrocarbon substituted succinic acid esters wherein the hydrocarbon substituent is an aliphatic carbon chain containing a large number of carbon atoms. Such products are disclosed, for example, in U.S. Pat. No. 3,381,022 which describes oil soluble esters, diesters and mixtures of substantially saturated polymerized olefin substituted succinic acid with mono or polyhydric aliphatic alcohols having up to 40 carbon atoms wherein the polymerized olefin substituent has at least about 50 aliphatic carbon atoms and a molecular weight of about 700 to 5000, with no more than 5% olefinic linkages. These succinic acid esters are described as being useful as additives in lubricants to impart detergent properties to the lubricant particularly under high and low temperature conditions. There is no disclosure, however, for incorporation of these lubricants into water based hydraulic fluids.

U.S. Pat. No. 4,368,133 describes aqueous systems containing functional additives which contain solubilizers made by reacting an alkyl substituted succinic anhydride containing about 12 to 500 carbon atoms with an alkanolamine. These compositions are water based hydraulic fluids and the succinic anhydride-alkanolamide reaction products are present as solubilizing agents.

U.S. Pat. No. 4,440,902 describes diesters of alkenyl succinic acids and ethylene oxide/propylene oxide block polymers and their use as demulsifiers for oil water emulsions and as corrosion protective agents and dispersants for dyestuffs. Similarly, U.S. Pat. No. 3,957,854 describes ester-containing compositions useful as additives in normally liquid fuels and lubricants wherein the oil soluble carboxylic acid esters are prepared by reacting an aliphatic hydrocarbon polycarboxylic acid acylating agent containing at least 30 aliphatic carbon atoms with at least one polyalkylene glycol which is a demulsifier for an aqueous emulsion, and at least one primary or secondary amine.

U.S. Pat. No. 4,036,772 discloses esters formed from high molecular weight carboxylic acids derived from low molecular weight ethylenically unsaturated carboxylic acid reagents and oxidized ethylene propylene interpolymers with mono or polyhydric alcohols. These esters are said to be useful in lubricant compositions and normally liquid fuel compositions.

It is also known from U.S. Pat. No. 4,256,605 and related U.S. Pat. Nos. 4,504,275, 4,504,276, and 4,509,950 that compositions useful as surfactants in the emulsification of oils in aqueous media may be obtained by blending two types of polyesters which are the products of condensation of an alkenyl succinic anhydride with a polyalkylene glycol. One type of polyester is derived from an anhydride in which the alkenyl group contains 40 to 500 carbon atoms, such as polyisobutenyl succinic anhydride, and the other type is derived from an anhydride in which the alkenyl group contains 8 to 18 carbon atoms. These compositions are said to be superior to the use of the polyester separately in providing emulsions of high stability produced with a low energy output. As acknowledged in column 1 of these patents, British Pat. No. 1,055,337 discloses esters obtained by the reaction of saturated hydrocarbon substituted succinic anhydrides containing at least 50 aliphatic carbon atoms in the substituent group with a polyhydric alcohol such as an alkylene glycol or polyalkylene glycol, and the use of such esters as additives for the purpose of imparting detergent properties to lubricant. This British patent corresponds to U.S. Pat. No. 3,381,022, discussed herein.

U.S. Pat. Nos. 3,045,042, 3,255,108, 4,481,125, 4,447,348, 4,419,665, 3,640,872, 2,993,773, 3,579,453, and 3,694,176 also disclose succinic acid esters wherein the ester moiety is a hydrocarbon or substituted hydrocarbon, and use of such esters in aqueous based hydraulic fluids of various types.

In none of this known prior art, however, are there to Applicant's knowledge description of substituted succinic acid esters and resulting aqueous based hydraulic fluids which are particularly useful in having high stability in hard water and in other areas where high water content hydraulic fluids are used.

SUMMARY OF THE INVENTION

It is accordingly one object of the present invention to provide an aqueous based hydraulic fluid composition which is particularly suitable for use in hard water based systems and provides excellent stability in such systems.

A further object of the present invention is to provide a dispersant composition comprising the reaction product of an alkenyl succinic anhydride and a polyethoxylated alcohol and use of such dispersant compositions in aqueous based hydraulic fluids.

An even further object of the present invention is to provide novel esters which are made by the reaction of a hydrocarbyl succinic anhydride wherein the hydrocarbyl substituent contains unsaturation, with an excess of a polyethoxylated alcohol under such conditions that a high percentage of the anhydride reactant is converted to the corresponding diester, and the use of such reaction products as surface active agents or dispersants to stabilize high water content hydraulic fluids, particularly when used in water of significant hardness.

Other objects and advantages of the present invention will become apparent as the description thereof proceeds.

In satisfaction of the foregoing objects and advantages, there is provided by the present invention ethoxylated esters of succinic anhydride which are useful as dispersants and more particularly, ester reaction products of long chain hydrocarbyl substituted succinic anhydride with polyethoxylated alcohols and use of these compositions as dispersants or surface active agents.

The present invention also provides an aqueous based hydraulic fluid having characteristics making it particularly suitable for use in water of significant hardness, which composition comprises a dispersant which is an ester reaction product of a hydrocarbyl substituted succinic anhydride with an excess of a polyethoxylated alcohol, a surfactant, corrosion inhibitors and water.

Also provided by the present invention are methods for preparation of the novel dispersant and hydraulic fluid and methods for use of the aqueous based hydraulic fluid of this invention.

DESCRIPTION OF PREFERRED EMBODIMENTS

The present invention relates to a novel group of succinic acid esters which are useful as dispersants in a series of aqueous based hydraulic fluids. The succinic acid esters are produced in general by a series of reactions starting with the reaction of a hydrocarbyl substituted succinic anhydride with at least one equivalent, preferably 1-3 equivalents, of maleic anhydride to produce a succinic anhydride of the following formula:

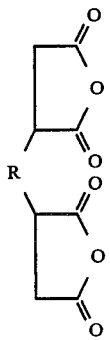

In the above formula, R is a hydrocarbyl or hydrocarbon substituent which contains at least about 10 carbon atoms. Preferably R contains olefinic unsaturation and branch chained configurations and provides the starting succinic anhydride with a molecular weight in the range of above about 700.

The reaction between the hydrocarbon substituted succinic anhydride and the maleic anhydride to produce the compound of Formula (I) is conducted by heating the succinic anhydride reactant to a temperature of about 150°-200° C. and thereafter adding at least one equivalent of the maleic anhydride to the succinic anhydride over a period of time such as 1 to 3 hours. After the addition is complete, the reaction mixture is then agitated for 2 to 4 hours to complete the reaction.

In an alternative procedure, the reaction product of succinic anhydride and one equivalent of maleic anhydride may then be further reacted with additional equivalents of maleic anhydride to add the additional anhydride groups so that the intermediate product may contain 3 or 4 anhydride groups. However, for purposes of use as a dispersant after reaction with alcohol, the basic product containing two anhydride groups performs satisfactorily.

The initial starting material, hydrocarbyl-substituted succinic acid is well known in the art and is disclosed for example in U.S. Pat. Nos. 3,923,669, 3,428,561, 4,086,251, and 4,450,281, the disclosures of which are incorporated herein by reference. As described in those patents and herein, the hydrocarbyl group R may be defined as a hydrocarbon which contains at least 10 carbon atoms. Preferably the hydrocarbyl group contains olefinic unsaturation but is otherwise substantially saturated or contains an aromatic ring. The olefinic unsaturation may be conjugated or nonconjugated and may be derived from diolefins, olefinic petroleum fractions and polyunsaturated polymers, oligomers, and copolymers. The polyunsaturated polymers are usually those derived by copolymerization of lower monoolefins with lower diolefins. Both types of olefins contain up to 12 carbon atoms. Suitable monoolefins include ethylene, propylene, 1-butene, 2-butene, isobutene and the pentenes, hexenes, and heptenes (all isomers included). Suitable diolefins include butadiene, 1,5-hexadiene, norbornadiene 1,5-dodecadiene, and the like. Furthermore, the olefin polymer can contain alicyclic or aromatic groups which may be derived from such monomers as cyclopentene, cyclohexene, 1,4-cyclohexadiene methylene cyclopentene, methylene cyclohexene, α-pinene, styrene, vinyl toluene, α-methylstyrene, and 3-phenyl-1,5-hexadiene. The preferred R group will provide a molecular weight to the starting material of about 700-3000. Polyalkenyl succinic anhydride represents a preferred general class of starting materials. Polyisobutenyl succinic anhydride is especially preferred. This material has a molecular weight of about 1000 to 1400 and is available commercially from Humphrey Chemical Company and Texaco.

The resulting dianhydride product of Formula (I) is then reacted with a molar excess of a polyethoxylated alcohol of the formula $R'(OCH_2CH_2)_xOH$, wherein R' is an alkyl, alkenyl, aralkyl or alkaryl group containing 1 to about 20 carbon atoms to produce the product of the invention. In conducting this reaction it is preferred to use about 3 to 6 moles, preferably 3 moles, of polyethoxylated alcohol per mole of hydrocarbyl succinic acid anhydride, but a larger excess may be used. The resulting product consists primarily of the esterified succinic acid of the following formula:

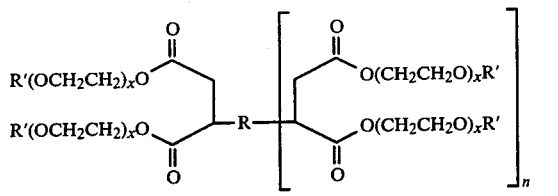

(II)

wherein R and R' are as described above, x is an integer of about 6 to 10 and n is 0, 1 or 2.

The reaction conditions for producing the polyester of Formula (II) are such that a very high percentage of the anhydride is converted to the diester derivative. However, a small amount of intermediate reaction products are present such as the product wherein some of the groups are esterified and others remain in the acid form. Also, since an excess of the alcohol is used, some free unreacted alcohol will also usually be present. It is an advantage of the present invention that a small amount of the partially esterified product and starting alcohol be present in combination with the fully esterified product since better performance is achieved in obtaining maximum stability when used in high water content fluids wherein the water is of significant hardness. Therefore, the present invention is inclusive of use of the completely esterified product of Formula (II) as the dispersant in hydraulic fluids, as well as mixtures in any proportions of the completely esterified product with partially esterified products of the following formula. Such products may be defined by the following formula, the products also being inclusive of mixtures with the alcohol:

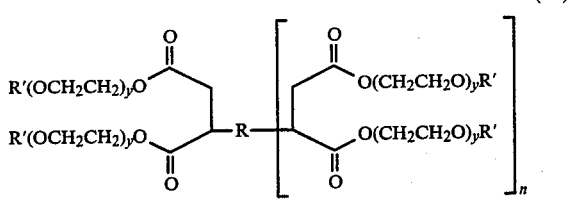

(III)

wherein n is 0, 1 or 2, R' is alkyl, alkenyl, aralkyl, or an alkaryl group containing 1 to about 20 carbon atoms and y is zero or an integer of 6 to 10, provided that at least one y but no more than 3 is zero, and when y is zero, R' is hydrogen, and also including proportions of unreacted alcohol in amounts of up to about 25% by weight.

The esterification reaction to produce the product of Formula (II) is conducted by heating the succinic anhydride intermediate of Formula (I) with a catalytic amount of an acid catalyst such as an alkali metal of acetic acid, as well as acid catalysts which are typically used to transform anhydrides and acids to esters, such as p-toluene sulfonic acid. Lithium acetate is particularly satisfactory. Sodium acetate and potassium acetate may also be used. These catalysts are used in catalytic amounts about 0.01 to 1.0 wt.%. The appropriate polyethoxylated alcohol or corresponding phenol or mixture thereof is then added to the heated succinic anhydride which should be at a temperature of about 100°–150° C. At least about three equivalents, and preferably three to six, most preferably three equivalents, of the polyethoxylated alcohol should be used per equivalent of succinic anhydride reactant. After addition of the polyethoxylated alcohol, the reaction mixture should then be stirred for about 2 to 10 hours until the total acid number of the reaction mixture is below 10. The total acid number is obtained by titration of a sample of the product with potassium hydroxide so that the value of 10 means 10 milligrams of KOH per gram of compound.

After preparation of the esterified product defined above by Formula (II), the resulting compound or mixture of compounds of Formula (III) may be used as the dispersant component in the formulation of an aqueous based hydraulic fluid. The esterified product of Formula (II) may be used without purification since it is desirable that a small amount of the intermediate reaction products (Formula III), such as half or one quarter esters and some alcohol starting material, have been found to contribute to performance of the ester for stability of the hydraulic fluid. Thus, the preferred composition of this invention will contain the completely esterified product as well as partial esters and some alcoholic starting material.

This ester product or mixture is used as the dispersant in formulation of an aqueous based hydraulic fluid which will also typically contain oil, an anti wear additive and corrosion inhibitors. Particular formulations of hydraulic fluid comprise the following:

| Component | Amounts |
| --- | --- |
| Dispersant (Formula II or III) | 10–40 wt. % |
| Surfactant | 15–30 wt. % |
| Corrosion inhibitors | 5–30 wt. % |
| Water | Balance |

In the above formulation, the dispersant, which is preferably present in an amount of about 12–16%, will be the inventive composition defined by Formula (II) mixtures of this composition with partially esterified products and starting alcohol as defined in Formula (III). The surfactant which is preferably present in amounts of about 18–22%, is most preferably a polyethoxylated octylphenol product which is available from the Rohm & Haas Company under the tradename "Triton" and particularly "Triton X-100". Preferred corrosion inhibitors include copper corrosion inhibitors as well as amines. The copper corrosion inhibitors are preferably present in amounts of about 7 to 10% and are particularly suitable when the hydraulic fluid is used with bearings which contain copper alloys. Satisfactory copper corrosion inhibitors include sodium mercaptobenzothiozoles, availabe from the R. T. Vanderbilt Corporation under the tradename "NACAP". Particularly preferred amines which are useful as vapor phase corrosion inhibitors, that is which inhibit corrosion just above the surface of the fluid include diethanolamine, monoethanolamine, dimethylethanolamine and the like.

The composition may also contain anti-wear additives such as zinc dialkyldithiophosphate, sold by The Lubrizol Corporation for this purpose, phosphate esters, or other known anti-wear agents. Anti-foam agents such as Foam Ban MS-30 sold by Ultra Adhesive Corporation, may also be included, as well as various other known additives for such hydraulic fluids, depending on the ultimate use. Anti-wear agents, anti-foam agents and the like are present in amounts of about 0.1 to 10% by weight. Anti-wear agents are preferably present in an amount of about 0.6 wt.%. The remainder of the composition will comprise water which is present in amounts which are not considered critical, but which may range from 20 to 80% by weight.

Aqueous based hydraulic fluids produced from the above formulation and using esters made from di- and trianhydrides of the invention are stable in water of extreme hardness for 7 days or more while maintained at 70° C. Water of extreme hardness is defined as containing at least 1500 ppm of calcium carbonate. On the other hand, hydraulic fluids produced by esterification of the monoanhydride were found to be stable in water of only 1000 ppm of calcium carbonate hardness for 7 days at 70° C. Thus, the ethoxylated esters of the present invention have outstanding advantages as dispersants, particularly when used in water of high mineral content, which makes the compositions particularly useful in certain areas.

The following examples are present to illustrate the invention but it is not to be considered as limited thereto. In the examples and throughout the specification, parts are by weight unless otherwise indicated.

EXAMPLE 1

In this example polyalkenyl succinic anhydride is heated to 170° C. and 1 molar equivalent of maleic anhydride is added slowly to the succinic anhydride over a period of 2 hours. After the addition is complete, the reaction mixture is then stirred for 3 hours without additional processing. This reaction produces the polyalkenyl disuccinic anhydride.

EXAMPLE 2

The polyalkenyl succinic anhydride starting material used in Example 1 is heated to 170° C. and 2 equivalents of maleic anhydride are added slowly over a period of 3 hours. After the addition is complete, the reaction mixture is stirred for 12 hours. This produces the polyalkenyl trisuccinic anhydride or the derivative which contains three anhydride groups.

EXAMPLE 3 (COMPARATIVE EXAMPLE)

Polyalkenyl succinic anhydride containing a single anhydride group is heated to 120° C. in combination with a catalytic amount of lithium acetate. Thereafter, a polyethoxylated alcohol is added in an amount of 3 equivalents of alcohol per equivalent of succinic anhydride. After addition of the alcohol, the reaction mixture is stirred for 5 hours until the total acid number is reduced to below 10 milligrams of KOH per gram of compound, which is obtained by titration with potassium hydroxide.

EXAMPLE 4

In this example the dianhydride produced from Example 1 is heated to 120° C. in combination with a catalytic amount of lithium acetate. Thereafter 3 equivalents per anhydride of polyethoxylated alcohol is added to the reaction mixture and stirring is continued for 5 hours until the total acid number is reduced to below 10 milligrams of KOH per gram of compound.

EXAMPLE 5

Polyalkenyl trisuccinic anhydride produced in Example 2 was heated to 120° C. in combination with a catalytic amount of lithium acetate. Thereafter, 3 equivalents per anhydride of a polyethoxylated alcohol is added to the mixture and stirred for 5 hours until the total acid number was reduced to below 10 milligrams of KOH per gram of compound.

EXAMPLE 6

The dispersants described as being produced in Examples 3, 4 and 5 were then formulated as aqueous based hydraulic fluids. The aqueous based hydraulic fluid contained the following formulation wherein the dispersant is the reaction product of Examples 3, 4 or 5:

| Component | Amounts |
|---|---|
| Dispersant (Formulation A,B,C) | 14 wt. % |
| Surfactant | 20 wt. % |
| Copper corrosion inhibitors | 8.6 wt. % |
| Amine | 20.4 wt. % |
| Water | 37% |

In the above formulation, the dispersant in Formulation A is the esterified monoanhydride of Example 3; the second formulation is the esterified dianhydride of Example 4, and the third formulation is the esterified trianhydride of Example 5. The surfactant in all cases was Triton X-100, which is a polyethoxylated octylphenol. The copper corrosion inhibitor is NACAP, which is sold by the R. T. Vanderbilt Corporation as a tradename for sodium mercaptobenzothiozole. The amines, which are vapor phase corrosion inhibitors, are diethanolamine and monoethanolamine.

The aqueous based hydraulic fluids made from the esters of the di and trianhydrides were found to be stable in water of extreme hardness, that is, up to 1500 ppm of calcium carbonate for more than 7 days while operating at 70° C. However, those made from the monoanhydride were found to be stable in water of only up to 1000 ppm calcium carbonate hardness for 7 days at 70° C.

The invention has been described herein with reference to certain preferred embodiments. However, as obvious variations thereon will become apparent to those skilled in the art, the invention is not to be considered as limited thereto.

What is claimed is:

1. A polyethoxylated ester of the following formula:

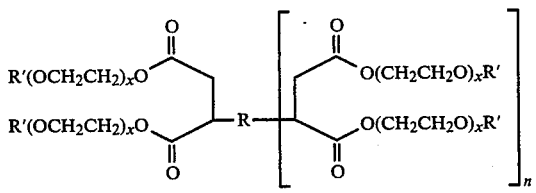

wherein x is an integer ranging from about 6 to 10, n is 1 or 2, R is a hydrocarbyl group which contains at least about 10 carbon atoms, and R' is an alkyl, alkenyl, aralkyl, or alkaryl group which contain from 1 to 20 carbon atoms.

2. An ester according to claim 1 wherein R is a hydrocarbyl group which contains olefinic unsaturation and provides a molecular weight to the compound of about 700 to 3000.

3. An ester according to claim 2 wherein R is an alkyl or alkenyl group having a molecular weight of at least 800.

4. An ester according to claim 1 wherein R' is alkyl or alkaryl.

5. An ester according to claim 1 wherein R is alkyl or alkenyl having a molecular weight of at least 800 and R' is alkyl or aralkyl of 10 to 20 carbon atoms.

6. An ester according to claim 1 wherein n is 1.

7. An ester according to claim 1 wherein n is 2.

8. An ester according to claim 1 wherein R is polyalkenyl.

9. A composition comprising the unpurified mixture of the total and partial ester reaction products and starting materials of the reaction of an anhydride of the following formula:

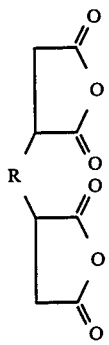

wherein R is a hydrocarbyl which contains at least 10 carbon atoms with a molar excess of a polyethoxylated alcohol of the formula $R'(OCH_2CH_2)_xOH$ wherein R' is alkyl, alkenyl, aralkyl, or alkaryl of 1 to 20 carbon atoms, and x is an integer of 6 to 10.

10. A reaction product according to claim 9 wherein R is polyalkenyl and 3 to 6 moles of polyethoxylated alcohol are reacted per mole of anhydride.

11. A mixture comprising a polyethoxylated ester of the formula:

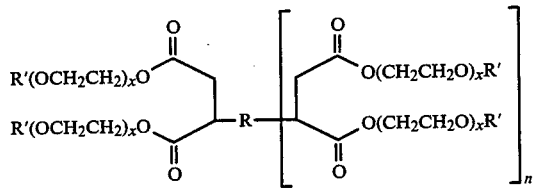

a partially esterified ester of the formula

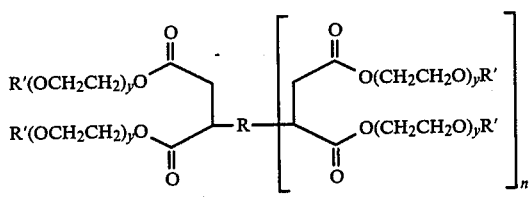

and a polyethoxylated alcohol of the formula

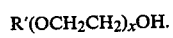

wherein n is 1 or 2, x is an integer of from 6 to 10, R is a hydrocarbyl group containing at least 10 carbon atoms, R' is alkyl, alkenyl, aralkyl or an alkaryl group having 1 to 20 carbon atoms, and y is zero or an integer of 6 to 10, provided that at least one y but not more than 3 y's are zero, and when y is zero, R' is hydrogen.

12. A mixture according to claim 11 wherein R is polyalkenyl and n is 1.

13. A mixture according to claim 11 wherein one y is zero.

14. A method for the preparation of the polyethoxylated alkenyl succinic anhydride mixture of claim 9 which comprises the reaction of an anhydride of the formula:

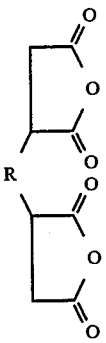

wherein R is as defined in claim 9, with at least 3 equivalents of a polyethoxylated alcohol of the formula $R'(OCH_2CH_2)_xOH$ per equivalent of anhydride, wherein R' is as defined in claim 9, the reaction being conducted at a temperature of about 160°–200° C.

15. A method according to claim 14 wherein 3 to 6 moles of polyethoxylated alcohol are reacted per mole of anhydride.

16. A method for the preparation of the polyethoxylated succinic anhydride mixture of claim 11 which comprises the reaction of an anhydride of the formula:

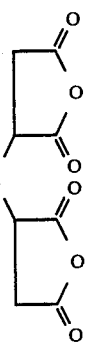

with at least 3 equivalents of a polyethoxylated alcohol of the formula $R'(OCH_2CH_2)_xOH$ per equivalent of anhydride, wherein R, R' and x are as defined in claim 11, the reaction being conducted at a temperature of about 160°–200° C.

17. An aqueous based hydraulic fluid comprising as a dispersant, an ester of claim 1 in combination with a surfactant, corrosion inhibitors and water.

18. An aqueous based hydraulic fluid comprising the following formulation:

| Component | Amounts |
| --- | --- |
| Dispersant | 10–40 wt. % |
| Surfactant | 15–30 wt. % |
| Corrosion inhibitors | 5–30 wt. % |
| Water | Balance | wherein the dispersant is an ester of claim 1.

19. An aqueous based hydraulic fluid comprising as a dispersant, a composition of claim 9 in combination with a surfactant, corrosion inhibitors and water.

20. An aqueous based hydraulic fluid comprising the following formulation:

| Component | Amounts |
| --- | --- |
| Dispersant | 10–40 wt. % |
| Surfactant | 15–30 wt. % |
| Corrosion inhibitors | 5–30 wt. % |
| Water | Balance | wherein the dispersant is a composition of claim 9.

21. An aqueous based hydraulic fluid comprising as a dispersant, a mixture of claim 11 in combination with a surfactant, corrosion inhibitors and water.

22. An aqueous based hydraulic fluid comprising the following formulation:

| Component | Amounts |
| --- | --- |
| Dispersant | 10–40 wt. % |
| Surfactant | 15–30 wt. % |
| Corrosion inhibitors | 5–30 wt. % |
| Water | Balance | wherein the dispersant is a mixture of claim 11.

23. An aqueous based hydraulic fluid as in claim 18 which also contains an anti-wear agent.

24. An aqueous based hydraulic fluid as in claim 20 which also contains an anti-wear agent.

25. An aqueous based hydraulic fluid as in claim 22 which also contains an anti-wear agent.

* * * * *